US009022487B2

(12) United States Patent
Brinkley et al.

(10) Patent No.: US 9,022,487 B2
(45) Date of Patent: May 5, 2015

(54) SYSTEM AND METHOD FOR BRAKE ASSISTED TURNING (75) Inventors: Jerry Lee Brinkley, Woodridge, IL (US); Benjamin Lee McCash, Burr Ridge, IL (US); Adam Robert Rusciolelli, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 547 days.

(21) Appl. No.: 13/208,161

(22) Filed: Aug. 11, 2011

(65) Prior Publication Data

US 2013/0038118 A1 Feb. 14, 2013

(51) Int. Cl.
*B60T 13/00* (2006.01)
*B60T 11/21* (2006.01)
*B62D 11/08* (2006.01)
*B62D 11/24* (2006.01)

(52) U.S. Cl.
CPC ............... *B60T 11/21* (2013.01); *B62D 11/08* (2013.01); *B62D 11/24* (2013.01)

(58) Field of Classification Search
CPC ................................ B60T 11/21; B62D 11/08
USPC .................................. 303/167, 155; 280/264
See application file for complete search history.

(56) References Cited

U.S. PATENT DOCUMENTS

| 4,702,358 | A | 10/1987 | Mueller et al. |
| 5,229,944 | A | 7/1993 | Yasuno |
| 5,267,783 | A | 12/1993 | Inoue et al. |
| 5,307,888 | A * | 5/1994 | Urvoy ............................. 180/6.2 |
| 6,021,367 | A | 2/2000 | Pilutti et al. |
| 6,059,383 | A | 5/2000 | Paggi et al. |
| 6,216,806 | B1 * | 4/2001 | Toms ............................. 180/6.2 |
| 6,527,070 | B2 * | 3/2003 | Ryan .............................. 180/6.7 |
| 6,588,858 | B2 | 7/2003 | Ritz et al. |
| 6,612,394 | B2 | 9/2003 | Wessman |
| 6,623,089 | B2 | 9/2003 | Amberkar |
| 6,766,236 | B1 * | 7/2004 | Lamela et al. .................. 701/50 |
| 6,805,218 | B2 * | 10/2004 | Wakitani et al. .............. 180/315 |
| 7,097,262 | B2 | 8/2006 | Sasaki |
| 7,182,353 | B2 * | 2/2007 | Divers ........................... 280/88 |
| 7,318,629 | B1 | 1/2008 | Sun et al. |
| 7,529,600 | B2 | 5/2009 | Mori et al. |
| 7,668,637 | B2 | 2/2010 | O'Dea |
| 7,690,737 | B2 | 4/2010 | Lu |
| 7,712,845 | B2 * | 5/2010 | Mackovjak et al. .......... 303/147 |
| 8,046,134 | B2 * | 10/2011 | Huang et al. .................... 701/42 |
| 8,561,751 | B2 * | 10/2013 | Brinkley et al. .............. 180/421 |
| 2009/0250997 | A1 * | 10/2009 | Mamei et al. ............... 303/117.1 |
| 2011/0291471 | A1 * | 12/2011 | Epple ........................... 303/9.61 |

FOREIGN PATENT DOCUMENTS

JP 10100740 A 4/1998

* cited by examiner

*Primary Examiner* — Thomas Irvin
(74) *Attorney, Agent, or Firm* — Sue C. Watson (57) ABSTRACT A system and method for brake assisted turning are provided. One system includes a pedal operated braking system configured to apply hydraulic brake pressure to brakes of a vehicle when one or more brake pedals are pressed. The system also includes a steer assist braking system configured to apply hydraulic brake pressure to the brakes of the vehicle based at least partly on a steering angle. The system includes hydraulic shut-off circuitry configured to selectively enable and disable operation of the steer assist braking system.

18 Claims, 4 Drawing Sheets

SYSTEM AND METHOD FOR BRAKE ASSISTED TURNING

BACKGROUND

The invention relates generally to vehicle brake systems and, more particularly, to a system and method for brake assisted turning.

Vehicle braking systems are often operated manually by an operator pressing one or more brake pedals. For example, certain passenger vehicles may have one brake pedal that, when pressed, activates left and right brakes. Other vehicles, such as certain agricultural, work, and off-road vehicles, may have two brake pedals, one brake pedal for the left brakes and another brake pedal for the right brakes. Although the brakes are often operated by manually pressing a brake pedal, the brakes may also be operated automatically using control systems. For example, a control system may determine certain times when it is appropriate to apply the brakes and the control system may automatically apply the brakes.

One circumstance where the brakes may be automatically controlled is when a vehicle is turning. As may be appreciated, when turning a vehicle, the turning radius may be larger than desired. Therefore, the brakes may be applied during the turn to improve the turning radius of the vehicle. Further, it should be noted that, certain vehicles, such as agricultural vehicles, may have a larger turning radius than other vehicles and, thus, have a greater need for improving their turning radius. The brakes may be applied during a turn either manually by pressing a brake pedal or automatically by using a control system. When manually applying the brakes, an operator may apply too little or too much pressure to the brakes. Conversely, when the brakes are applied automatically, the control system may monitor various parameters to apply an optimal amount of brake pressure. However, such braking systems may be limited in their ability to automatically control vehicle braking. Accordingly, there exists a need for braking systems that accurately control automatic vehicle braking.

BRIEF DESCRIPTION

In one embodiment, a system includes a pedal operated braking system configured to apply hydraulic brake pressure to brakes of a vehicle when one or more brake pedals are pressed. The system also includes a steer assist braking system configured to apply hydraulic brake pressure to the brakes of the vehicle based at least partly on a steering angle. The system includes hydraulic shut-off circuitry configured to selectively enable and disable operation of the steer assist braking system.

In another embodiment, a system includes a hydraulic pump configured to pump hydraulic fluid from a reservoir to the braking system. The braking system also includes a pedal operated portion fluidly coupled to the hydraulic pump and configured to receive hydraulic fluid from the hydraulic pump and to apply hydraulic brake pressure to brakes of a vehicle when one or more brake pedals are pressed. The braking system includes a shut-off valve fluidly coupled to the hydraulic pump and configured to receive hydraulic fluid from the hydraulic pump. The braking system also includes a steer assist portion fluidly coupled to the shut-off valve and configured to receive hydraulic fluid from the shut-off valve based on a position of the shut-off valve. The steer assist portion has a left proportional valve and a right proportional valve. The left and right proportional valves are configured to apply hydraulic brake pressure to the brakes of the agricultural vehicle based at least partly on a steering angle.

In another embodiment, a method of braking a vehicle includes monitoring a steering angle of the vehicle and proportionally activating a left brake valve of a steer assist braking system when the steering angle is greater than a left turn activation angle. The method also includes proportionally activating a right brake valve of the steer assist braking system when the steering angle is greater than a right turn activation angle. The method includes overriding the proportional activation of the left brake valve when a left brake pedal is pressed and overriding the proportional activation of the right brake valve when a right brake pedal is pressed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
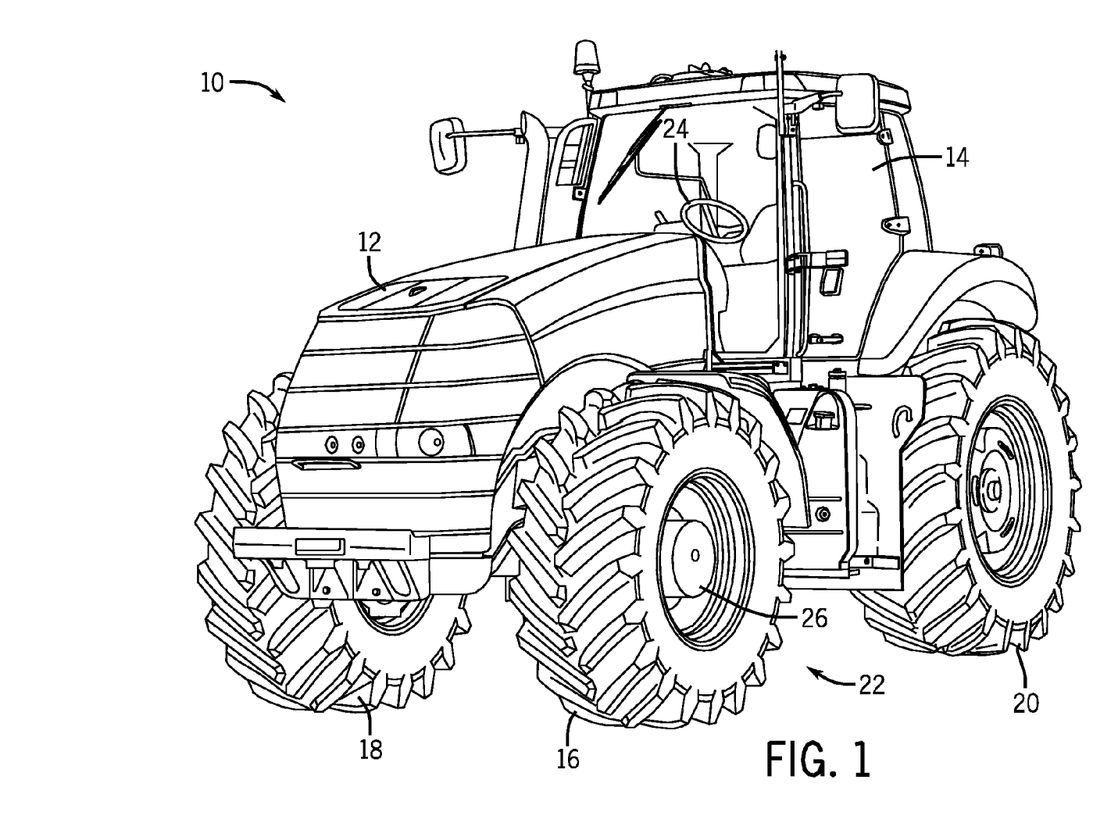
FIG. 1 is a perspective view of an embodiment of an agricultural vehicle that may employ a steer assist braking system.

FIG. 1 illustrates an exemplary agricultural vehicle 10 that may employ a steer assist braking system. In certain embodiments, the agricultural vehicle 10 may be any type of tractor, combine, truck, or other off-road or work vehicle. The vehicle 10 as illustrated has a body 12 that may house an engine, transmission, and power train (not separately shown). Further, the agricultural vehicle 10 has a cabin 14 where an operator may sit or stand to operate the vehicle 10. The vehicle 10 has a front left wheel 16, a front right wheel 18, a rear left wheel 20, and a rear right wheel 22 (not visible) that rotate to move the vehicle 10. As may be appreciated, the vehicle 10 is maneuvered using a steering wheel 24 that causes the wheels 16 and 18 to turn. The wheels 16 and 18 are coupled together by an axle 26 so that both wheels 16 and 18 may be rotated together. In certain embodiments, the vehicle 10 is a rear wheel drive vehicle. The agricultural vehicle 10 may include a steer assist braking system designed to automatically apply pressure to brakes when making a turn. For example, the braking system may apply a left brake when making a left turn and a right brake when making a right turn. Further, the braking system may be configured to automatically apply brakes when the vehicle 10 is turned at an angle greater than a minimum steering angle, and to not apply brakes automatically when the vehicle 10 is turned at an angle less than the minimum steering angle. Moreover, as discussed below, the automatic application of brakes for assisting steering may be enabled only at certain speeds or speed ranges, such as to allow for such assist only when below some desired speed.

Figure 2:
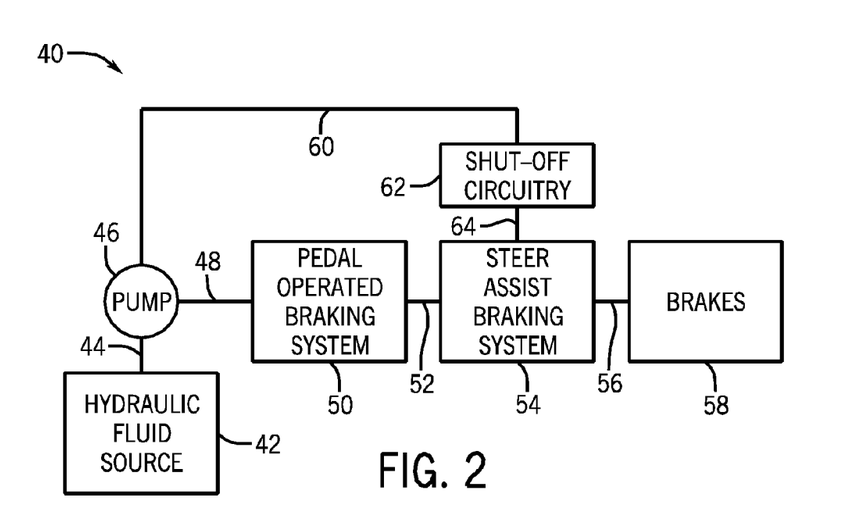
FIG. 2 is a block diagram of an embodiment of a braking system with steer assist braking.

FIG. 2 is a block diagram of a braking system 40 with steer assist braking. The braking system 40 is operated using hydraulic fluid from a hydraulic fluid source 42, such as a reservoir or tank. The hydraulic fluid is pumped from the hydraulic fluid source 42 through a flow path 44 by a hydraulic pump 46. As may be appreciated, in certain embodiments, the hydraulic pump 46 may be a fixed or variable displacement pump. The hydraulic fluid flows from the pump 46, through flow path 48 to a pedal operated braking system 50. The pedal operated braking system 50 uses one or more brake pedals to manually operate brakes. The hydraulic fluid flows from the pedal operated braking system 50, through flow path 52 to a steer assist braking system 54. When manually operating the brake pedals, the hydraulic fluid flows through bypass valves in the steer assist braking system 54, through a flow path 56, and to brakes 58.

The hydraulic fluid also flows from the pump 46 through flow path 60 to shut-off circuitry 62. If the shut-off circuitry 62 is in a closed position, the hydraulic fluid does not flow from the shut-off circuitry 62 to the steer assist braking system 54, and steer assist for braking is effectively disabled. However, if the shut-off circuitry 62 is in an open position, the hydraulic fluid flows from the shut-off circuitry 62, through flow path 64 to the steer assist braking system 54, enabling steer assist for braking. When the steer assist braking system 54 is activated by a control system, the hydraulic fluid flows through the steer assist braking system 54 to the brakes 58. As may be appreciated, the shut-off circuitry 62 inhibits the steer assist braking system 54 from operating when the shut-off circuitry 62 is in the closed position. Therefore, when the shut-off circuitry 62 inhibits the flow of the hydraulic fluid to the flow path 64, the braking system 40 will function solely using the pedal operated braking system 50. It may be appreciated that in certain embodiments the pump 46 may pump hydraulic fluid through the braking system 40 to maintain a pressure regulated circuit, such as by regulating the pressure to approximately 300 PSI.

Figure 3:
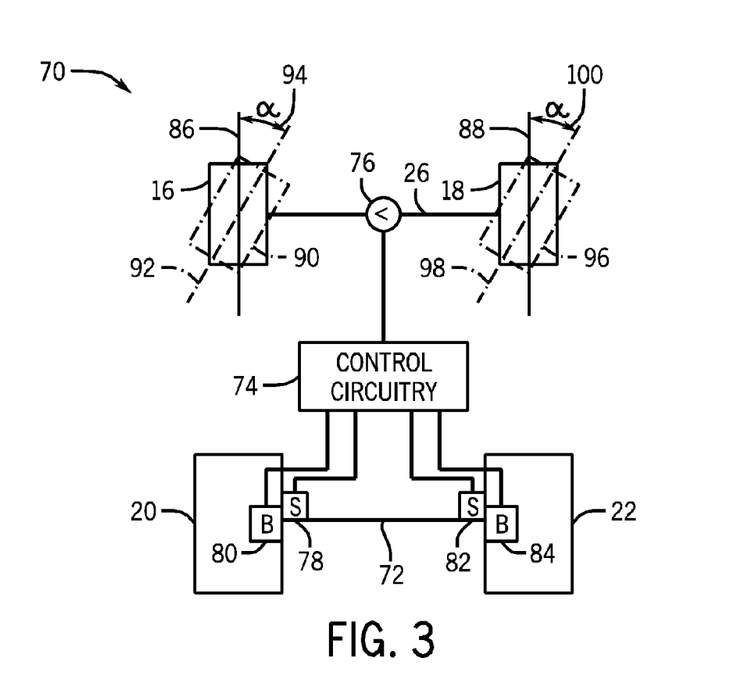
FIG. 3 is a schematic diagram of an embodiment of a control system for steer assist braking.

FIG. 3 is a schematic diagram illustrating a control system 70 for steer assist braking. The front wheels 16 and 18 are illustrated with the front axle 26 connecting the wheels 16 and 18 together. The rear wheels 20 and 22 are also illustrated and have a rear axle 72 that couples the wheels 20 and 22 together. The control system 70 includes control circuitry 74 that is used to monitor data and provide control signals for automatically applying the brakes. The control circuitry 74 may include various controllers, such as a transmission controller, etc. Specifically, a steering angle sensor 76 is positioned along the front axle 26 and provides a steering angle (e.g., angular displacement of the axle 26) to the control circuitry 74. For example, in a presently contemplated embodiment, if the front wheels 16 and 18 are turned, the steering angle sensor 76 provides a steering angle signal to the control circuitry 74 to indicate the current angle of turn. Thus, the steering angle sensor 76 provides signals to the control circuitry 74 to indicate an angle and a direction (e.g., left or right) of turn.

A speed sensor 78 is illustrated as being coupled to the left rear wheel 20. The speed sensor 78 measures the rotational speed of the left rear wheel 20 and provides a signal representative of this information to the control circuitry 74. The control circuitry 74 is also connected to a left brake 80 of the left rear wheel 20 so the control circuitry 74 can automatically control the operation of the left brake 80. Similar to the left side, a speed sensor 82 is coupled to the right rear wheel 22. The speed sensor 82 measures the rotational speed of the right rear wheel 22 and provides a signal representative of this information to the control circuitry 74. The control circuitry 74 is also connected to a right brake 84 of the right rear wheel 22 so the control circuitry 74 can automatically control the operation of the right brake 84. The left and right brakes 80 and 84 are considered "service" brakes which are different brakes than "emergency" brakes. It should be noted that in one presently contemplated embodiment, the wheel speeds are monitored so that the control circuitry 74 can tailor the aggressiveness of the braking in order to obtain ideal wheel speeds. Further, the control circuitry 74 may control the amount of braking pressure applied in order to prevent the brakes from locking (i.e., anti-lock braking controls).

In the illustration, the front wheels 16 and 18 are aligned to be in a straight direction as shown by lines 86 and 88 extending from the front wheels 16 and 18. As may be appreciated, the front wheels 16 and 18 may be turned to the right or to the left. A turned left wheel 90 depicts the front left wheel 16 turned from the straight direction shown by line 86 to a turned direction shown by line 92. An angle 94 is the angle between the lines 86 and 92 and is the turn angle. For example, the angle 94 illustrated may be approximately 40 degrees to the right. In other embodiments, the angle 94 may range between approximately 0 degrees to approximately 90 degrees, and, again, the angle 94 may be to the left or to the right. A turned right wheel 96 depicts the front right wheel 18 turned from the straight direction shown by line 88 to a turned direction shown by line 98. An angle 100 is the angle between the lines 88 and 98 and is the turn angle. For example, the angle 100 illustrated may be approximately 40 degrees to the right. In other embodiments, the angle 100 may range between approximately 0 degrees to approximately 90 degrees, and the angle 100 may be to the left or to the right.

In certain embodiments, the angle 94 and/or the angle 100 must pass a minimum angle before the control circuitry 74 will enable steer assist braking. For example, in some embodiments, the angle 94 may need to be greater than 10 degrees to activate the steer assist braking. In other embodiments, the angle 94 may need to be greater than 25 degrees to activate the steer assist braking. As may be appreciated, the minimum angle may be any value, such as approximately 0 degrees to approximately 90 degrees. Furthermore, in certain embodiments, the control circuitry 74 may use the speed measured from speed sensors 78 and 82 as a threshold for activating the steer assist braking. For example, if the speed sensors 78 and 82 provide data indicating a speed greater than approximately 12 kilometers per hour (kph), the control circuitry 74 may not activate the steer assist braking. It should be noted that the control circuitry 74 may use any speed as a threshold for not activating the brakes 80 and 84. In addition, the steering angle sensor 76 and the speed sensors 78 and 82 may be used to determine an amount of brake pressure to be applied to the brakes 80 and 84. For example, as the steering angle increases, the amount of brake pressure applied to the brakes 80 and 84 may increase. Likewise, as the speed of the wheels 20 and 22 increases, the amount of brake pressure applied to the brakes 80 and 84 may increase.

Figure 4:
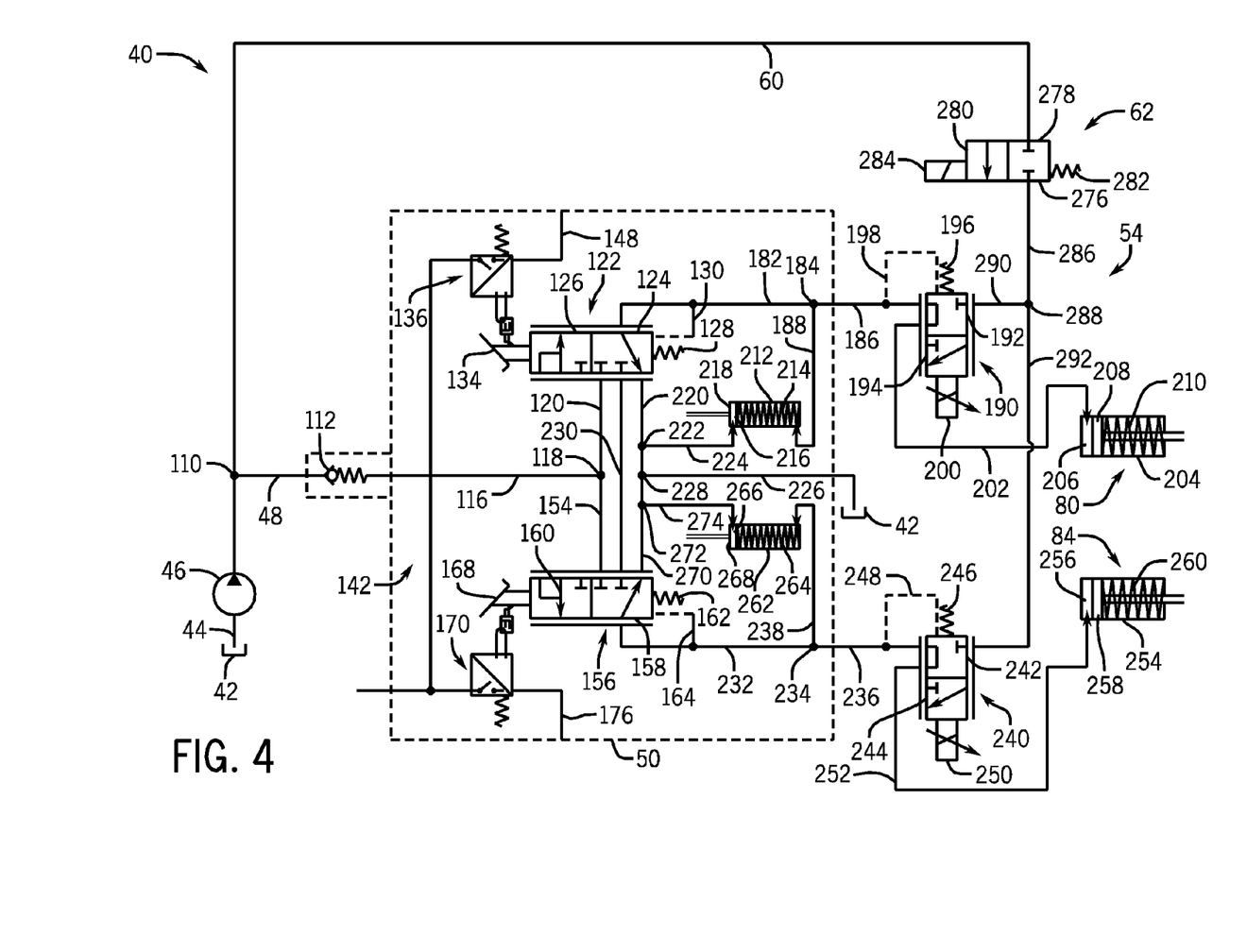
FIG. 4 is a schematic diagram of an embodiment of a braking system with steer assist braking.

FIG. 4 is a schematic diagram of an exemplary braking system 40 with steer assist braking. As previously discussed, the hydraulic pump 46 pumps the hydraulic fluid from the hydraulic fluid source 42 to the braking system 40. The hydraulic fluid flows from the pump 46 to a connection 110 where the hydraulic fluid is diverted into the flow paths 48 and 60. The flow path 48 directs the hydraulic fluid to the pedal operated braking system 50. As the hydraulic fluid enters the pedal operated braking system 50, the hydraulic fluid flows through a spring loaded ball check valve 112 to a flow path 116 (e.g., an inlet to the system 50). The check valve 112 allows unidirectional flow of the hydraulic fluid so that the hydraulic fluid can flow from the connection 110 to the flow path 116, but the hydraulic fluid cannot flow from the flow path 116 to the connection 110.

The hydraulic fluid flows through flow path 116 to a connection 118 where the hydraulic fluid is directed to a left section, a right section, or both sections. Beginning with the left section, the hydraulic fluid flows through flow path 120 to a left manual brake valve 122. The left manual brake valve 122 is a proportional valve (e.g., throttling valve) and has two positions. A first position 124 allows hydraulic fluid to discharge from the left brake 80 to the hydraulic source 42, and a second position 126 allows hydraulic fluid to flow from the flow path 120 to the left brake 80.

The left manual brake valve 122 is moved to the first position 124 by pressure exerted on the valve 122 by a spring 128 and a first pilot 130. Conversely, the left manual brake valve 122 is moved to the second position 126 by pressure exerted on the valve 122 by a left brake pedal 134. The left manual brake valve 122 is initially in the first position 124 based on the pressure exerted by the spring 128. The left manual brake valve 122 then moves between the first and second positions 124 and 126 as the first pilot 130 and the left brake pedal 134 apply and remove force. For example, when the combined forces exerted by the spring 128 and the first pilot 130 are greater than the force exerted by the left brake pedal 134, the left manual brake valve 122 will be in the first position 124. In contrast, when the combined forces exerted by the spring 128 and the first pilot 130 are less than the force exerted by the left brake pedal 134, the left manual brake valve 122 will be in the second position 126.

As may be appreciated, under certain conditions there may be a loss of hydraulic pressure to the left brake pedal 134. When this occurs, the left brake pedal 134 may be pressed farther than normal causing a left emergency brake switch 136 to transition from an open position to a closed position. In the closed position electric current may flow through the switch 136, which connects conductor 142 and 148. The closed switch 136 causes the vehicle 10 emergency brakes to be activated.

Returning to the connection 118, hydraulic fluid also flows to the right section. Specifically, the hydraulic fluid flows through a flow path 154 to a right manual brake valve 156. The right manual brake valve 156 is also a proportional valve (e.g., throttling valve) with two positions. A first position 158 allows hydraulic fluid discharge from the right brake 84 to the hydraulic source 42, and a second position 160 allows hydraulic fluid to flow from the flow path 154 to the right brake 84.

The right manual brake valve 156 is moved to the first position 158 by force exerted on the valve 156 by a spring 162 and a second pilot 164. Conversely, the right manual brake valve 156 is moved to the second position 160 by force exerted on the valve 156 by a right brake pedal 168. Initially, the right manual brake valve 156 will be in the first position 158 based on the force exerted by the spring 162. The right manual brake valve 156 then moves between the first and second positions 158 and 160 as the second pilot 164 and the right brake pedal 168 apply and remove force. For example, when the combined forces exerted by the spring 162 and the second pilot 164 are greater than the force exerted by the right brake pedal 168, the right manual brake valve 156 will be in the first position 158. In contrast, when the combined forces exerted by the spring 162 and the second pilot 164 are less than the force exerted by the right brake pedal 168, the right manual brake valve 156 will be in the second position 160.

As may be appreciated, under certain conditions there may be a loss of hydraulic pressure to the right brake pedal 168. When this occurs, the right brake pedal 168 may be pressed farther than normal causing a right emergency brake switch 170 to transition from an open position to a closed position. In the closed position electric current may flow through the switch 170, which connects conductors 142 and 176. Like switch 136, the closed switch 170 causes the vehicle 10 emergency brakes to be activated.

Returning to the left manual brake valve 122, when this valve is in the second position 126, the hydraulic fluid flows from the left manual brake valve 122, through a flow path 182 and to a connection 184. From the connection 184, the hydraulic fluid flows to flow paths 186 and 188. In particular, the hydraulic fluid flows through the flow path 186 to a left proportional brake valve 190. The left proportional brake valve 190 has two positions. A first position 192 allows hydraulic fluid to flow from the flow path 186 to the left brake 80, and a second position 194 allows hydraulic fluid to flow from the shut-off circuitry 62 to the left brake 80.

The left proportional brake valve 190 is moved (i.e., actuated) to the first position 192 by force exerted on the valve 190 by a spring 196 and a third pilot 198. Conversely, the left proportional brake valve 190 is moved to the second position 194 by force exerted on the valve 190 by a proportional solenoid 200. Initial conditions position the left proportional brake valve 190 in the first position 192 based on the force exerted by the spring 196. The left proportional brake valve 190 then moves between the first and second positions 192 and 194 as the third pilot 198 and the solenoid 200 apply and remove force. For example, when the combined forces exerted by the spring 196 and the third pilot 198 are greater than the force exerted by the solenoid 200, the left proportional brake valve 190 will be in the first position 192. In contrast, when the combined forces exerted by the spring 196 and the third pilot 198 are less than the force exerted by the solenoid 200, the left proportional brake valve 190 will be in the second position 194. Further, the proportional solenoid 200 may be energized by the control circuitry 74 described in FIG. 3. For example, the proportional solenoid 200 may be controlled to allow a varying amount of the hydraulic fluid to flow from the shut-off circuitry 62 to the left brake 80, such as by varying the current or voltage flow to the solenoid 200.

The hydraulic fluid flows from the left proportional brake valve 190, through a flow path 202 to the left brake 80. As illustrated, the left brake 80 includes a left brake cylinder 204. Further, the left brake cylinder 204 has a fluid section 206, a piston rod 208, and a spring 210. When the brake 80 is not being applied, the spring 210 presses the piston rod 208 to the left side of the brake cylinder 204, as illustrated. Conversely, when hydraulic fluid flows into the fluid section 206, the hydraulic fluid pushes the piston rod 208 against the spring 210 toward the right side of the brake cylinder 204 and applies the left brake 80.

Returning to the connection 184, the hydraulic fluid may also flow from the connection 184 through the flow path 188 to a left master cylinder 212. Like brake cylinder 204, the left master cylinder 212 has a spring 214, a piston rod 216, and a fluid section 218. As may be appreciated, the piston rod 216 may be held in one direction (e.g., to the left as illustrated) by a combination of the spring force and the hydraulic fluid force that flows from the flow path 188 into the cylinder 212. Conversely, the piston rod 216 may move in the opposite direction (e.g., to the right) by force applied to the piston rod 216. In some embodiments, hydraulic fluid may flow through a flow path 220, a connection 222, a flow path 224, and into the fluid section 218 when the piston rod 216 moves to the right. Further, in certain embodiments, hydraulic fluid may flow from the fluid source 42, through a flow path 226, a connection 228, the flow path 224 and into the fluid section 218 when the piston rod 216 moves to the right. In addition, as may be appreciated, the left brake pedal 134 may be coupled to the piston rod 216 such that when the left brake pedal 134 is pressed, the left brake pedal 134 presses the piston rod 216 toward the spring 214. For example, the left brake pedal 134 may be pressed further than normal when a loss of hydraulic pressure occurs. When the left brake pedal 134 is pressed beyond a certain point, the pedal 134 may press against the piston rod 216 to apply force against the spring 214. Further, this may cause hydraulic fluid to flow out of the cylinder 212, through the flow path 188, and to the left brake 80.

It should be noted that a flow path 230 may allow hydraulic fluid to flow between the left manual brake valve 122 and the right manual brake valve 156 when both valves 122 and 156 are in the second position 126 and 160. The flow path 230 allows hydraulic fluid pressure to be equalized between the left and right braking sections, thus decreasing the occurrence of pulling to the left or right while braking with both brake pedals 134 and 168. Returning now to the right manual brake valve 156, when the right manual brake valve 156 is in the second position 160, the hydraulic fluid flows from the right manual brake valve 156, through a flow path 232 and to a connection 234. From the connection 234, the hydraulic fluid flows to flow paths 236 and 238. Specifically, the hydraulic fluid flows through the flow path 236 to a right proportional brake valve 240. The right proportional brake valve 240 has two positions. A first position 242 allows hydraulic fluid to flow from the flow path 236 to the right brake 84, and a second position 244 allows hydraulic fluid to flow from the shut-off circuitry 62 to the right brake 84.

The right proportional brake valve 240 is moved (i.e., actuated) to the first position 242 by force exerted on the valve 240 by a spring 246 and a fourth pilot 248. Conversely, the right proportional brake valve 240 is moved to the second position 244 by force exerted on the valve 240 by a proportional solenoid 250. Initial conditions position the right proportional brake valve 240 in the first position 242 based on the force exerted by the spring 246. The right proportional brake valve 240 then moves between the first and second positions 242 and 244 as the fourth pilot 248 and the solenoid 250 apply and remove force. For example, when the combined forces exerted by the spring 246 and the fourth pilot 248 are greater than the force exerted by the solenoid 250, the right proportional brake valve 250 will be in the first position 242. In contrast, when the combined forces exerted by the spring 246 and the fourth pilot 248 are less than the force exerted by the solenoid 250, the right proportional brake valve 240 will be in the second position 244. The proportional solenoid 250 may be energized by the control circuitry 74 described in FIG. 3. For example, the proportional solenoid 250 may be controlled to allow a varying amount of the hydraulic fluid to flow from the shut-off circuitry 62 to the right brake 84, such as by varying the current or voltage flow to the solenoid 250.

The hydraulic fluid flows from the right proportional brake valve 250, through a flow path 252 to the right brake 84. The right brake 84 includes a right brake cylinder 254. In particular, the right brake cylinder 254 has a fluid section 256, a piston rod 258, and a spring 260. When the brake 84 is not being applied, the spring 260 presses the piston rod 258 to the left side of the brake cylinder 254, as illustrated. Conversely, when hydraulic fluid flows into the fluid section 256, the hydraulic fluid pushes the piston rod 258 against the spring 260 toward the right side of the cylinder 254 and applies the right brake 84.

Returning to the connection 234, the hydraulic fluid may also flow from the connection 234 through the flow path 238 to a right master cylinder 262. Like cylinder 254, the right master cylinder 262 has a spring 264, a piston rod 266, and a fluid section 268. As may be appreciated, the piston rod 266 may be held in one direction (e.g., to the left as illustrated) by a combination of the spring 264 force and the hydraulic fluid force from fluid that flows through the flow path 238 into the cylinder 262. Conversely, the piston rod 266 may move in the opposite direction (e.g., to the right) by force applied to the piston rod 266. In some embodiments, hydraulic fluid may flow through a flow path 270, a connection 272, a flow path 274, and into the fluid section 268 when the piston rod 266 moves to the right. Further, in certain embodiments, hydraulic fluid may flow from the fluid source 42, through the flow path 226, the connection 228, the flow path 274 and into the fluid section 268 when the piston rod 266 moves to the right. In addition, as may be appreciated, the right brake pedal 168 may be coupled to the piston rod 266 such that when the right brake pedal 168 is pressed, the right brake pedal 168 presses the piston rod 266 against the spring 264. For example, the right brake pedal 168 may be pressed farther than normal when a loss of hydraulic pressure occurs. When the right brake pedal 168 is pressed beyond a certain point, it may press against the piston rod 266 to apply force against the spring 264. Further, this may cause hydraulic fluid to flow out of the cylinder 262, through the flow path 238, and to the right brake 84.

Returning to the connection 110, the hydraulic fluid flowing from the pump 46 may flow through the flow path 60 to the shut-off circuitry 62. Specifically, the hydraulic fluid may flow from the flow path 60 to a shut-off valve 276. The shut-off valve 276 has two positions, a closed position 278 that inhibits hydraulic fluid from flowing through the shut-off valve 276, and an open position 280 that allows hydraulic fluid to flow through the shut-off valve 276. As may be appreciated, the shut-off valve 276 inhibits the steer assist braking system 54 from operating when the valve 276 is in the closed position 278. Conversely, the steer assist braking system 54 may operate when the valve 276 is in the open position 280.

The shut-off valve 276 is moved to the closed position 278 by force exerted on the valve 276 by a spring 282. Conversely, the shut-off valve 276 is moved to the open position 280 by force exerted on the valve 276 by a solenoid 284 (i.e., shut-off solenoid). Initial conditions position the shut-off valve 276 in the closed position 278 based on the force exerted by the spring 282. The shut-off valve 276 then moves between the closed and open positions 278 and 280 as the solenoid 284 is energized and de-energized. For example, when the force exerted by the spring 282 is greater than the force exerted by the solenoid 284, the shut-off valve 276 will be in the closed position 278. In contrast, when the force exerted by the spring 282 is less than the force exerted by the solenoid 284, the shut-off valve 276 will be in the open position 280. When the shut-off valve 276 is in the open position 280, hydraulic fluid flows through the shut-off valve 276, through a flow path 286, and to a connection 288. From the connection 288, the hydraulic fluid may flow through a flow path 290 to the left proportional brake valve 190, or the hydraulic fluid may flow through a flow path 292 to the right proportional brake valve 240.

During operation of the vehicle 10, an operator may press the left brake pedal 134 causing the left manual brake valve 122 to move to the second position 126. Hydraulic fluid may then flow from the pump 46 and through the manual brake valve 122. Hydraulic fluid then flows through the left proportional brake valve 190 (which is in the first position 192) and to the left brake cylinder 204. The left brake cylinder 204 causes pressure to be applied to the left brake 80. As may be appreciated, the left proportional brake valve 190 is held in the first position 192 by the spring 196 and by hydraulic fluid pressure applied to the third pilot 198. When the operator releases the left brake pedal 134, the spring 210 in the left brake cylinder 204 presses against the piston rod and causes the piston rod 208 to push hydraulic fluid out of the fluid section 206. The hydraulic fluid then flows from the left brake cylinder 204, through the left proportional brake valve 190, and to the left manual brake valve 122 (which is now in the first position 124). The hydraulic fluid flows through the left manual brake valve 122 and is drained into the fluid source 42. As may be appreciated, the operator may press the right brake pedal 168 to apply pressure to the right brake 84 and the right section of the brake system 40 may operate in a similar manner to the left section just described.

The steer assist braking system 54 may be enabled by energizing the solenoid 284 to move the shut-off valve 276 to the open position 280. With the steer assist braking system 54 enabled, the control circuitry 74 (illustrated in FIG. 3) may send control signals to the proportional solenoids 200 and 250 to move the proportional valves 190 and 240 to the second positions 194 and 244. For example, the vehicle 10 may perform a left turn. During the left turn, the control circuitry 74 may determine that the left brake 80 should be applied to reduce the steering radius. Therefore, the control circuitry 74 energizes the solenoid 200 to move the left proportional valve 190 to the second position 194. Hydraulic fluid then flows through the left proportional valve 190 and to the left brake cylinder 204 which applies the left brake 80.

It should be noted that, in the previous example, the amount of brake pressure applied is controlled by the proportional solenoid 200. For example, if the control circuitry 74 determines that a large amount of brake pressure is to be applied to the left brake 80 than the control circuitry 74 sends an appropriate signal to the proportional solenoid 200 to cause the proportional valve 190 to allow a large amount of hydraulic fluid to flow through the valve 190 (e.g., a signal with a high voltage or current is sent to the solenoid 200). Conversely, if the control circuitry 74 determines that a small amount of brake pressure is to be applied to the left brake 80, than the control circuitry 74 sends an appropriate signal to the proportional solenoid 200 to cause the proportional valve 190 to allow a small amount of hydraulic fluid to flow through the valve 190 (e.g., a signal with a low voltage or current is sent to the solenoid 200). Thus, the left brake 80 may be proportionally controlled. The right proportional valve 240 may be controlled to operate in a similar manner for applying the right brake 84. By proportionally controlling the left and right brakes 80 and 84 during a turn, the turning radius of the vehicle 10 may be improved.

Under certain conditions, one of the brake pedals 134 and 168 may be pressed while the steer assist braking system 54 is activating one of the brakes 80 and 84. When this occurs, the manual brake pedals 134 and 168 override any steer assist braking. This occurs for the left section braking because the combined pressure of the third pilot 198 and the spring 196 will be greater than the pressure applied by the solenoid 200. The same is true for the right section where the combined pressure of the fourth pilot 248 and the spring 246 will be greater than the pressure applied by the solenoid 250. It should be noted that the valves 122, 156, 190, 240, and 276 may be hydro-mechanical valves, electro-hydraulic valves, or another type of valve. Also, although proportional solenoids 200 and 250 are used to activate the steer assist braking, certain embodiments may not use proportional solenoids, but instead may use standard solenoids or other devices that may be switched on when a minimum steering angle is reached.

Figures 5, 6:
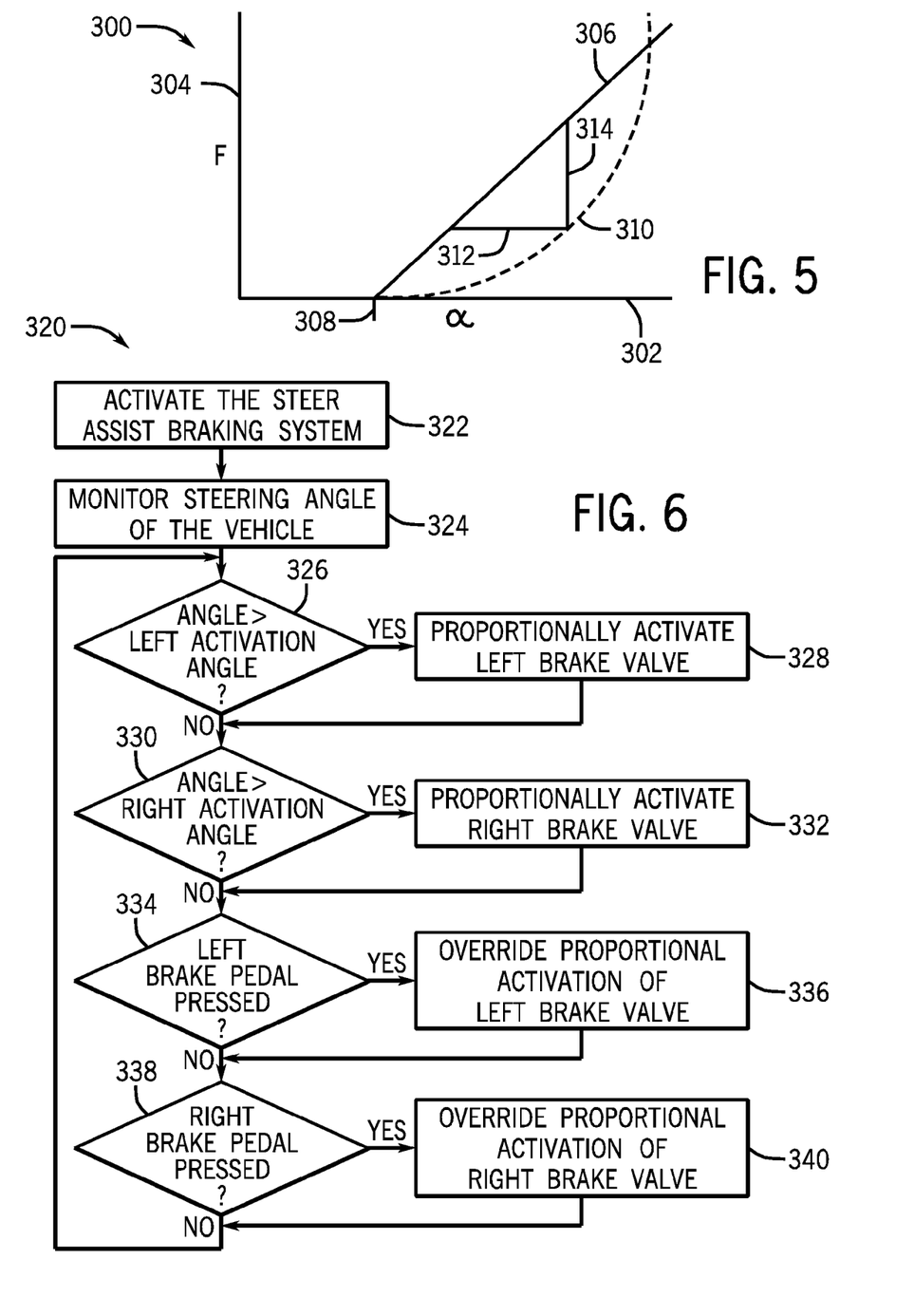
FIG. 5 is a graph illustrating an embodiment of a relationship between a steering angle and an applied braking force.
FIG. 6 is a flow chart of a method of braking a vehicle using a steer assist braking system.

FIG. 5 is a graph 300 illustrating a comparison between a steering angle 302 and an applied braking force 304. A line 306 illustrates one embodiment of steer assist braking with a fixed slope correlation between the steering angle 302 and the applied braking force 304. As illustrated, there is a minimum angle 308 that is reached before any braking force 304 is applied. This is the threshold steering angle that is passed before any braking force 304 is applied. For example, the shut-off circuitry 62 may be in the closed position to not allow hydraulic fluid to flow to the brakes until the steering angle is passed. Passing the steering angle may energize the solenoid 284 to transition the shut-off circuitry 62 to the open position. In other embodiments, the shut-off circuitry 62 may be in the open position, but the proportional solenoids 200 and 250 may not be energized until the steering angle threshold is passed.

A line 310 illustrates how there may be a variable slope correlation (e.g., exponential correlation) between the steering angle 302 and the applied braking force 304. Further, a line 312 illustrates the angle difference between lines 306 and 310 when a certain force is applied. For example, an embodiment using line 306 to correlate the steering angle 302 and the applied braking force 304 would apply the force represented by line 312 at a smaller angle than an embodiment using line 310. Similarly, a line 314 illustrates the difference between the applied brake force of lines 306 and 310 at a certain steering angle. For example, an embodiment using line 306 to correlate the steering angle 302 and the applied braking force 304 would apply a greater force at an angle represented by line 314 than an embodiment using line 310.

FIG. 6 is a flow chart of a method 320 of braking a vehicle using the steer assist braking system 54. At step 322, the system is activated, such as by the steering system 40 transitioning the shut-off circuitry 62 to the open position. Then, at step 324, a steering angle of the vehicle 10 is monitored so the steering system 40 can determine whether a threshold steering angle is reached. For example, the steering angle may be monitored by the control circuitry 74 using the angle sensor 76 as described in relation to FIG. 3. Next, at step 326, the steering system 40 determines whether the steering angle is greater than a left activation steering angle. If the steering angle is greater than the left activation angle, the steering system 40 proportionally activates the left brake valve 190, per step 328.

If the steering angle is less than the left activation angle, the method proceeds to step 330. At step 330, the steering system 40 compares the steering angle to a right activation steering angle. If the steering angle is greater than the right activation angle, the steering system 40 proportionally activates the right brake valve 240, per step 332. If the steering angle is less than the right activation angle, the method proceeds to step 334. At step 334, the steering system 40 determines whether the left brake pedal 134 is pressed. If the left brake pedal 134 is pressed, the steering system 40 overrides the proportional activation of the left brake valve 190 and positions the left brake valve 190 for manual braking, per step 336. Next, at step 338, the steering system 40 determines whether the right brake pedal 168 is pressed.

If the right brake pedal 168 is pressed, the steering system 40 overrides the proportional activation of the right brake valve 240 and positions the right brake valve 240 for manual braking, per step 340. The method then returns to step 326 and repeats steps 326 through 340 during vehicle operation until the steer assist braking system 54 is deactivated, such as by the steering system 40 transitioning the shut-off circuitry 62 to the closed position. It should be noted that certain steps presented above may be performed in a different order than described. Further, certain steps that are inherent in a braking system 40 may be performed, such as operating the pump 46 to pump hydraulic fluid through the system 40.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a pedal operated braking system configured to apply hydraulic brake pressure to brakes of a vehicle when one or more brake pedals are pressed;
a steer assist braking system configured to apply hydraulic brake pressure to the brakes of the vehicle based on wheel speeds and a steering angle; and
hydraulic shut-off circuitry configured to selectively enable and disable operation of the steer assist braking system;
wherein the steer assist braking system comprises a left brake proportional valve and a right brake proportional valve, each brake proportional valve includes a first position and a second position, the first position of each brake proportional valve enables flow of hydraulic fluid from a respective manual brake valve of the pedal operated braking system to a respective brake cylinder of the brakes and blocks flow of the hydraulic fluid from the hydraulic shut-off circuitry to the respective brake cylinder, the second position of each brake proportional valve enables flow of the hydraulic fluid from the hydraulic shut-off circuitry to the respective brake cylinder and blocks flow of the hydraulic fluid from the respective manual brake valve to the respective brake cylinder, and each brake pedal of the one or more brake pedals is coupled to one respective manual brake valve; and
wherein a pilot is fluidly coupled to each respective manual brake valve, the pilot is configured to direct the hydraulic fluid from the respective manual brake valve to a first side of the respective brake proportional valve upon depression of a respective brake pedal to urge the respective brake proportional valve toward the first position.

2. The system of claim 1, wherein the steer assist braking system comprises a left brake proportional solenoid coupled to a second side of the left brake proportional valve and a right brake proportional solenoid coupled to a second side of the right brake proportional valve, each brake proportional solenoid is configured to urge the respective brake proportional valve to the second position to cause a variable amount of hydraulic brake pressure to be applied to the brakes of the vehicle.

3. The system of claim 1, control circuitry including a speed sensor coupled to the wheel of the vehicle and an angle sensor positioned along a front axle of the vehicle, wherein the control circuitry is configured to control the operation of the steer assist braking system based on at least one of a speed signal received from the speed sensor and a steering angle signal received from the angle sensor.

4. The system of claim 1, comprising a hydraulic pump configured to provide the hydraulic fluid to the pedal operated braking system and the steer assist braking system.

5. The system of claim 4, wherein the hydraulic pump is configured to provide the hydraulic fluid to the pedal operated braking system and the steer assist braking system in parallel.

6. The system of claim 1, wherein the steer assist braking system is configured to apply hydraulic brake pressure proportionally based on the steering angle.

7. The system of claim 1, wherein the hydraulic shut-off circuitry comprises a shut-off solenoid coupled to a shut-off valve, the shut-off valve configured to enable operation of the steer assist braking system when the shut-off solenoid is energized.

8. The system of claim 1, wherein a spring urges each respective brake proportional valve toward the first position.

9. A system comprising:
a hydraulic pump configured to pump hydraulic fluid from a reservoir to the braking system;
a pedal operated portion fluidly coupled to the hydraulic pump and configured to receive hydraulic fluid from the hydraulic pump and to apply hydraulic brake pressure to brakes of an agricultural vehicle when one or more brake pedals are pressed;
a shut-off valve fluidly coupled to the hydraulic pump and configured to receive hydraulic fluid from the hydraulic pump; and
a steer assist portion fluidly coupled to the shut-off valve and configured to receive hydraulic fluid from the shut-off valve based on a position of the shut-off valve, the steer assist portion having a left proportional valve and a right proportional valve, the steer assist portion further comprising control circuitry including a first speed sensor coupled to a left wheel of the agricultural vehicle, a second speed sensor coupled to a right wheel of the agricultural vehicle and an angle sensor positioned along a front axle of the agricultural vehicle, wherein the control circuitry is configured to apply hydraulic brake pressure to the brakes of the agricultural vehicle via the left and right proportional valves based at least partly on a speed signal received from the first and second speed sensors and a steering angle signal received from the angle sensor;
wherein each proportional valve includes a first position and a second position, the first position of each proportional valve enables flow of the hydraulic fluid from a respective manual brake valve of the pedal operated portion to a respective brake cylinder of the brakes and blocks flow of the hydraulic fluid from the shut-off valve to the respective brake cylinder, the second position of each proportional valve enables flow of the hydraulic fluid from the shut-off valve to the respective brake cylinder and blocks flow of the hydraulic fluid from the respective manual brake valve to the respective brake cylinder, and each brake pedal of the one or more brake pedals is coupled to one respective manual brake valve; and
wherein a pilot is fluidly coupled to each respective manual brake valve, the pilot is configured to direct the hydraulic fluid from the respective manual brake valve to a first side of the respective proportional valve upon depression of a respective brake pedal to urge the respective proportional valve toward the first position.

10. The system of claim 9, wherein the pedal operated portion is configured to apply hydraulic brake pressure to a left brake using a left brake pedal and to a right brake using a right brake pedal.

11. The system of claim 9, wherein the shut-off valve comprises an open position and a closed position, the open position configured to enable the hydraulic fluid to flow to the steer assist portion and the closed position configured to block the hydraulic fluid from flowing to the steer assist portion.

12. The system of claim 11, wherein the shut-off valve is configured to be in the open position when the agricultural vehicle is traveling at low vehicle speeds and to be in the closed position when the agricultural vehicle is traveling at high vehicle speeds.

13. The system of claim 9, wherein the left proportional valve and the right proportional valve are configured to provide a proportional amount of braking pressure to the brakes based at least partly on the steering angle.

14. The system of claim 13, wherein the steer assist portion is configured so that when the steering angle increases, the amount of hydraulic braking pressure to the brakes increases.

15. The system of claim 13, wherein the steer assist portion is configured so that when the agricultural vehicle is steered to the left, hydraulic brake pressure is applied to a left brake and when the agricultural vehicle is steered to the right, hydraulic brake pressure is applied to a right brake.

16. The system of claim 9, wherein the steer assist portion is configured to apply hydraulic brake pressure to the brakes when the steering angle is greater than a steering activation angle.

17. The system of claim 9, wherein the steer assist portion comprises a left proportional solenoid coupled to a second side of the left proportional valve and a right proportional solenoid coupled to a second side of the right proportional valve, each proportional solenoid is configured to urge a respective proportional valve to the second position to cause a variable amount of hydraulic brake pressure to be applied to the brakes of the vehicle.

18. The system of claim 9, wherein a spring urges each respective proportional valve toward the first position.

* * * * *